(12) United States Patent
Daly et al.

(10) Patent No.: US 10,887,032 B2
(45) Date of Patent: *Jan. 5, 2021

(54) RECEIVING AN EMERGENCY ALERT MESSAGE VIA A BROADCAST DATA CHANNEL

(71) Applicant: AT&T Intellectual Property I, L.P., Atlanta, GA (US)

(72) Inventors: Brian K. Daly, Peachtree Corners, GA (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,241

(22) Filed: Apr. 24, 2019

(65) Prior Publication Data

US 2019/0253165 A1  Aug. 15, 2019

Related U.S. Application Data

(63) Continuation of application No. 15/369,500, filed on Dec. 5, 2016, now Pat. No. 10,313,036, which is a continuation of application No. 14/921,808, filed on Oct. 23, 2015, now Pat. No. 9,537,588, which is a
(Continued)

(51) Int. Cl.
*H04H 20/71* (2008.01)
*H04H 20/59* (2008.01)
*H04W 4/90* (2018.01)
*H04W 76/50* (2018.01)
(Continued)

(52) U.S. Cl.
CPC ............ *H04H 20/71* (2013.01); *H04H 20/59* (2013.01); *H04W 4/06* (2013.01); *H04W 4/90* (2018.02); *H04W 76/50* (2018.02); *H04M 3/5116* (2013.01); *H04M 2242/02* (2013.01); *H04M 2242/04* (2013.01)

(58) Field of Classification Search
CPC ....... H04W 76/007; H04W 4/06; H04W 4/22; H04H 20/59; H04H 20/71; H04M 2242/04; H04M 3/5116
USPC ................. 455/404.2, 3.01, 526, 527, 404.1; 340/7.21, 7.29, 691.3, 7.48; 370/312; 379/37, 41, 45, 218.02
See application file for complete search history.

(56) References Cited

U.S. PATENT DOCUMENTS

| | | |
|---|---|---|
| 6,043,757 A | 3/2000 | Patrick et al. |
| 6,084,510 A | 7/2000 | Lemelson et al. |
| 6,593,851 B1 | 7/2003 | Bornstein |

(Continued)

*Primary Examiner* — Inder P Mehra
(74) *Attorney, Agent, or Firm* — BakerHostetler

(57) ABSTRACT

A mobile device may be configured with multiple receivers (e.g., a cellular receiver, a broadcast receiver such as FM, AM, DTV, a satellite receiver, a NWR receiver, etc.). Upon receipt of an emergency alert message via at least one of the receivers, the mobile device, via an application installed on the mobile device, may extract the emergency alert message from a data channel of the broadcast. The mobile device, via the application, may process the extracted emergency alert message to determine if the emergency alert message is to be rendered via the device. And, if the emergency alert message is to be rendered, the mobile device, via the application, may format the extracted emergency alert message to conform to a standard format (e.g., Commercial Mobile Alert System, CMAS, format).

19 Claims, 9 Drawing Sheets

Related U.S. Application Data continuation of application No. 13/454,786, filed on Apr. 24, 2012, now Pat. No. 9,173,070.

(51) Int. Cl.
*H04W 4/06* (2009.01)
*H04M 3/51* (2006.01)

(56) References Cited

U.S. PATENT DOCUMENTS

| | | |
|---|---|---|
| 6,603,405 B2 | 8/2003 | Smith |
| 6,670,908 B2 | 12/2003 | Wilson et al. |
| 6,728,522 B1 | 4/2004 | Marrah et al. |
| 6,825,792 B1 | 11/2004 | Letovsky |
| 7,725,256 B2 | 5/2010 | Marsh |
| 7,995,998 B2 | 8/2011 | Wright et al. |
| 8,519,860 B2 | 8/2013 | Johnson et al. |
| 9,173,070 B2 | 10/2015 | Daly et al. |
| 9,537,588 B2 | 1/2017 | Daly et al. |
| 2001/0010490 A1 | 8/2001 | Bellin |
| 2003/0216133 A1 | 11/2003 | Poltorak |
| 2005/0041639 A1 | 2/2005 | Hulkkonen et al. |
| 2007/0037549 A1 | 2/2007 | Poltorak |
| 2007/0143816 A1 | 6/2007 | Gupta et al. |
| 2007/0273480 A1* | 11/2007 | Burkman ............ H04L 29/06 340/7.52 |
| 2008/0272884 A1 | 11/2008 | Lovell |
| 2009/0042546 A1 | 2/2009 | McClendon |
| 2009/0239497 A1 | 9/2009 | Sennett et al. |
| 2009/0247111 A1 | 10/2009 | Sennett et al. |
| 2009/0247116 A1 | 10/2009 | Sennett et al. |
| 2010/0002139 A1 | 1/2010 | Park |
| 2010/0009651 A1 | 1/2010 | Daly et al. |
| 2010/0079278 A1 | 4/2010 | Suzuki et al. |
| 2010/0229205 A1* | 9/2010 | Hakusui ............ H04H 20/72 725/62 |
| 2010/0240339 A1* | 9/2010 | Diamond ............ H04H 20/59 455/404.2 |
| 2011/0081884 A1 | 4/2011 | Sennett et al. |
| 2011/0165865 A1* | 7/2011 | Gao ............ H04W 72/005 455/414.1 |
| 2012/0129569 A1* | 5/2012 | Courtney ............ G08B 21/10 455/550.1 |
| 2012/0149361 A1* | 6/2012 | Esch ............ H04W 48/12 455/422.1 |
| 2012/0209487 A1 | 8/2012 | Busch |
| 2013/0046738 A1* | 2/2013 | Kuo ............ G01C 21/3682 707/690 |
| 2013/0073473 A1* | 3/2013 | Heath ............ G06Q 30/06 705/319 |
| 2013/0136212 A1* | 5/2013 | Shirasuka ............ H04N 21/4263 375/340 |
| 2017/0155960 A1 | 6/2017 | Christensen et al. |

\* cited by examiner

RECEIVING AN EMERGENCY ALERT MESSAGE VIA A BROADCAST DATA CHANNEL

CROSS REFERENCE TO RELATED APPLICATIONS

This application is a continuation of U.S. patent application Ser. No. 15/369,500, filed Dec. 5, 2016, which is a continuation of U.S. patent application Ser. No. 14/921,808, filed Oct. 23, 2015, now U.S. Pat. No. 9,537,588 issued on Jan. 3, 2017, which is a continuation of U.S. patent application Ser. No. 13/454,786, filed Apr. 24, 2012, now U.S. Pat. No. 9,173,070 issued Oct. 27, 2015, all of which are entitled "Receiving An Emergency Alert Message Via A Broadcast Data Channel". The content of U.S. patent application Ser. No. 15/369,500 is incorporated by reference herein in its entirety. The content of U.S. patent application Ser. No. 14/921,808 is incorporated by reference herein in its entirety. The content of U.S. patent application Ser. No. 13/454,786 is incorporated by reference herein in its entirety.

TECHNICAL FIELD

The technical field generally relates to public safety, and more specifically relates to receiving an emergency alert message, and even more specifically relates to receiving an emergency alert message via a broadcast data channel.

BACKGROUND

Today's population is mobile and mobile devices are ubiquitous. Many people have a mobile phone, mobile computer, PDA, or the like. Users of mobile devices continue to expect access to a variety of types of information. And, the airwaves are full of information. In any given region of the country, there may be many broadcast television, including digital television (DTV), and FM/AM radio stations broadcasting on assigned channels (e.g., frequencies). Also, a National Oceanic and Atmospheric Administration National Weather Service (NWR) may broadcast on an assigned NWR channel in the region. Further still, the region may comprise several satellite broadcast channels. In addition, the U.S. government may provide emergency alert messages via the emergency alert system (EAS). The EAS is capable of providing messages indicative of a variety of types of alerts. Via the EAS, recipients may receive messages pertaining to weather conditions, disasters, AMBER (America's Missing: Broadcast Emergency Response) alerts, and/or alerts issued by the Government, for example. Thus, it may be no surprise that channel availability and providing information to users of mobile devices may be problematic.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

An emergency alert message may be provided via a data channel associated with the broadcast transmission. A mobile device may be configured with multiple receivers (e.g., a cellular receiver, a broadcast receiver such as FM, AM, DTV, a satellite receiver, a NWR receiver, etc.). Upon receipt of the emergency alert message via at least one of the receivers, the mobile device, via an application installed on the mobile device, may extract the emergency alert message from the data channel. The mobile device, via the application, may process the extracted emergency alert message to determine if the emergency alert message is to be rendered via the device. And, if the emergency alert message is to be rendered, the mobile device, via the application, may format the extracted emergency alert message to conform to a standard format (e.g., Commercial Mobile Alert System, CMAS, format).

BRIEF DESCRIPTION OF THE DRAWINGS

Reference will now be made to the accompanying drawings, which are not necessarily drawn to scale.

DETAILED DESCRIPTION OF ILLUSTRATIVE EMBODIMENTS

Figure 1:
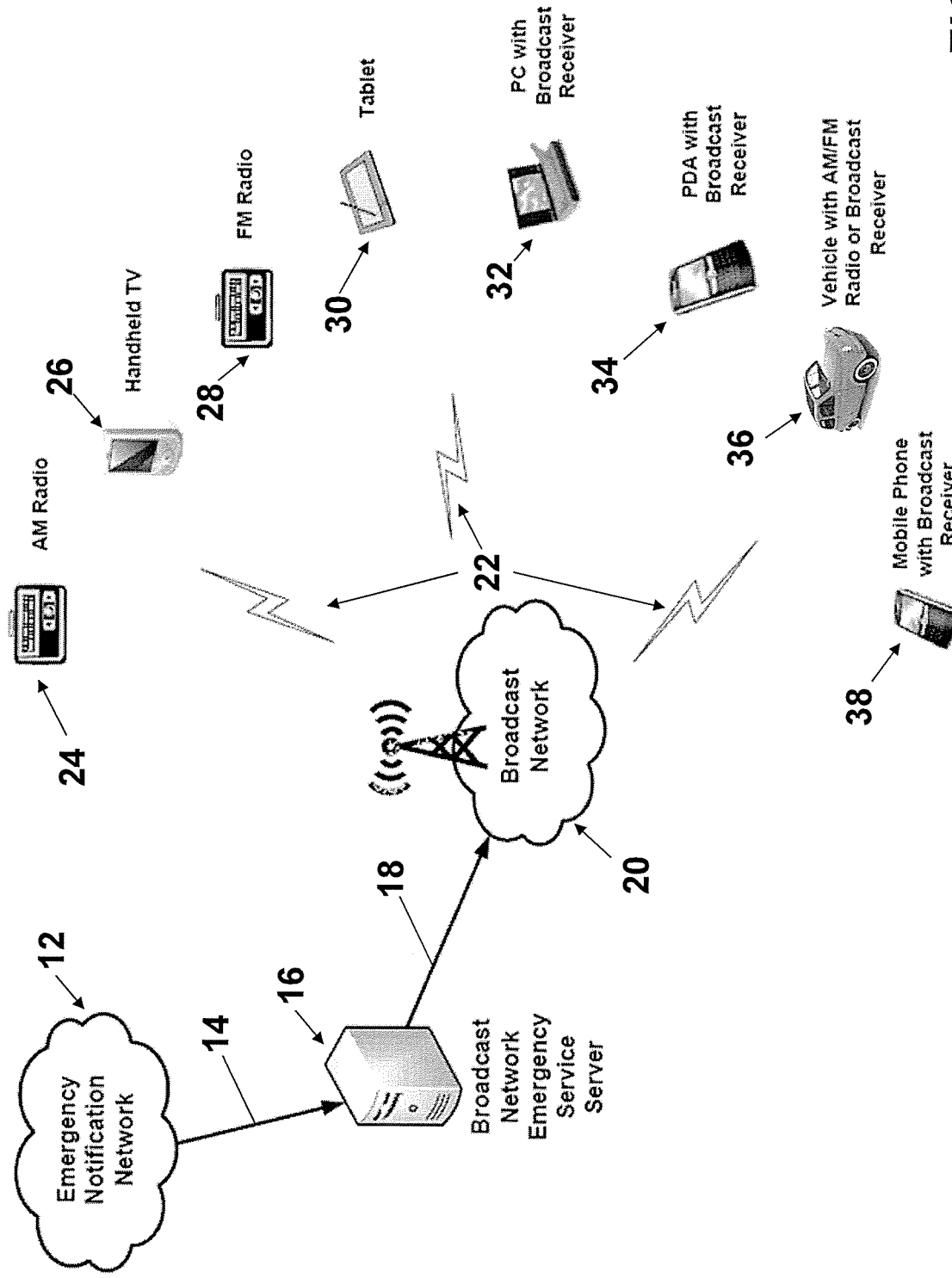
FIG. 1 is a flow diagram of an example system and process for distributing an emergency alert message via various services.

As described herein, a mobile device may contain multiple receivers for different services. For example, a mobile device may contain a receiver configured to receive FM radio transmissions, AM radio transmissions, NOAA Weather Radio (NWR) transmissions, television (TV) transmissions, digital television (DTV) transmissions, satellite radio/TV/DTV, satellite transmissions (e.g., satellite radio, global positioning, etc.), or the like, or any appropriate combination thereof. Emergency alert information may be delivered via one or more of these services. The mobile device may process the information and present the information to an end user in a format that is consistent across all receiver types and services. The mobile device may determine if the emergency alert information applies to the device based on location information and whether or not to render the emergency alert message.

In an example embodiment, a broadcast network (e.g., FM radio, AM radio, DTV, NWR, satellite, etc.) may have an associated data channel that may contain emergency alert information. For example, a broadcast may comprise a content (e.g., voice, video) channel and a data channel. The content channel and the data channel may be utilized concurrently. The content channel and the data channel may be mapped to the same physical channel for wireless communication. In an example embodiment, the content channel may be a circuit switched channel while the data channel may be a packet switched channel. In an example embodiment, an emergency alert message may be provided via a broadcast data channel. Thus, a mobile device may be able to receive content via a content channel and operate on the receive content, and concurrently receive an emergency alert message via a data channel. For example, a mobile device may be able to received NWR audio weather information, TV and DTV video programming, AM and FM audio entertainment, satellite audio and/or video information, or the like, or any appropriate combination thereof.

The data channel may comprise any appropriate data channel. In an example embodiment, the content channel and the data channel may comply with the Radio Broadcast Data System (RBDS) implementation of the Radio Data System (RDS) protocol. As such, the information may be embedded in FM, AM, NWR, TV, DTV, and/or satellite broadcasts in accordance with the RDS protocol. In an example configuration for FM broadcasts, the data channel may carry data at 1,187.5 bit per second on a 57 kHz subcarrier. The subcarrier may be set to the third harmonic of a 19 kHz FM stereo pilot signal. And, the data channel may be implemented within 4 kHz of bandwidth. Similar embodiments and variations may be implemented for AM, NWR, TV, DTV, and/or satellite broadcasts.

When received by a broadcast receiver of the mobile device, the emergency alert information may be stripped off from the broadcast content. Based upon information within the emergency alert information, a user may choose to opt out of certain classes of alerts (e.g., lower urgency, etc.). Alerts which the user is interested in receiving may be delivered to an emergency alert processor of the mobile device that compares the mobile device's current location (as determined by an internal GPS receiver, for example) to the specified alert area contained in the emergency alert information. If the alert is applicable to the location of the mobile device, the emergency alert information may be rendered on the mobile device for presentation to the user of the mobile device. In an example embodiment, the emergency alert information may be formatted to conform to a predetermined format in order to provide consistent presentations of emergency information, regardless of the service by which it was provided. The predetermined format may comprise any appropriate format or combination of formats. For example, the predetermined format may comprise a format compatible with the Commercial Mobile Alert System (CMAS), the Emergency Alert System (EAS), Public Warning System (PWS), Earthquake, Tsunami Warning System (ETWS), Child Abduction Alert System, J-Alert, National Severe Weather Warning Service, Tsunami Warning System, EU-Alerts, Mt Rainier Volcano Lahar Warning System, or the like. Thus, for emergency alert information that nay be delivered via alternate broadcast transmission types, the herein description may provide a common standardized method for users to opt out of certain classes of alerts, provide a common alert tone and/or vibration cadence, and a common presentation method in order for users to have the same experience regardless of the method via which the alert was received.

FIG. 1 is a flow diagram of an example system and process for distributing an emergency alert message via various services. An emergency alert message may be provided, at step 14, by emergency notification network 12, to a broadcast network emergency service server 16. The broadcast network emergency service server 16 may format the emergency alert message in accordance with formats compatible with intended recipients. The broadcast network emergency service server 16 may send the format emergency alert message, or messages, to intended recipients at step 22, via broadcast network 20. As a result, the intended recipients (depicted as intended recipients 24, 26, 28, 30, 32, 34, 36, and 38) may receive the emergency alert message via the appropriate broadcast technology and in an appropriate format.

Figure 2:
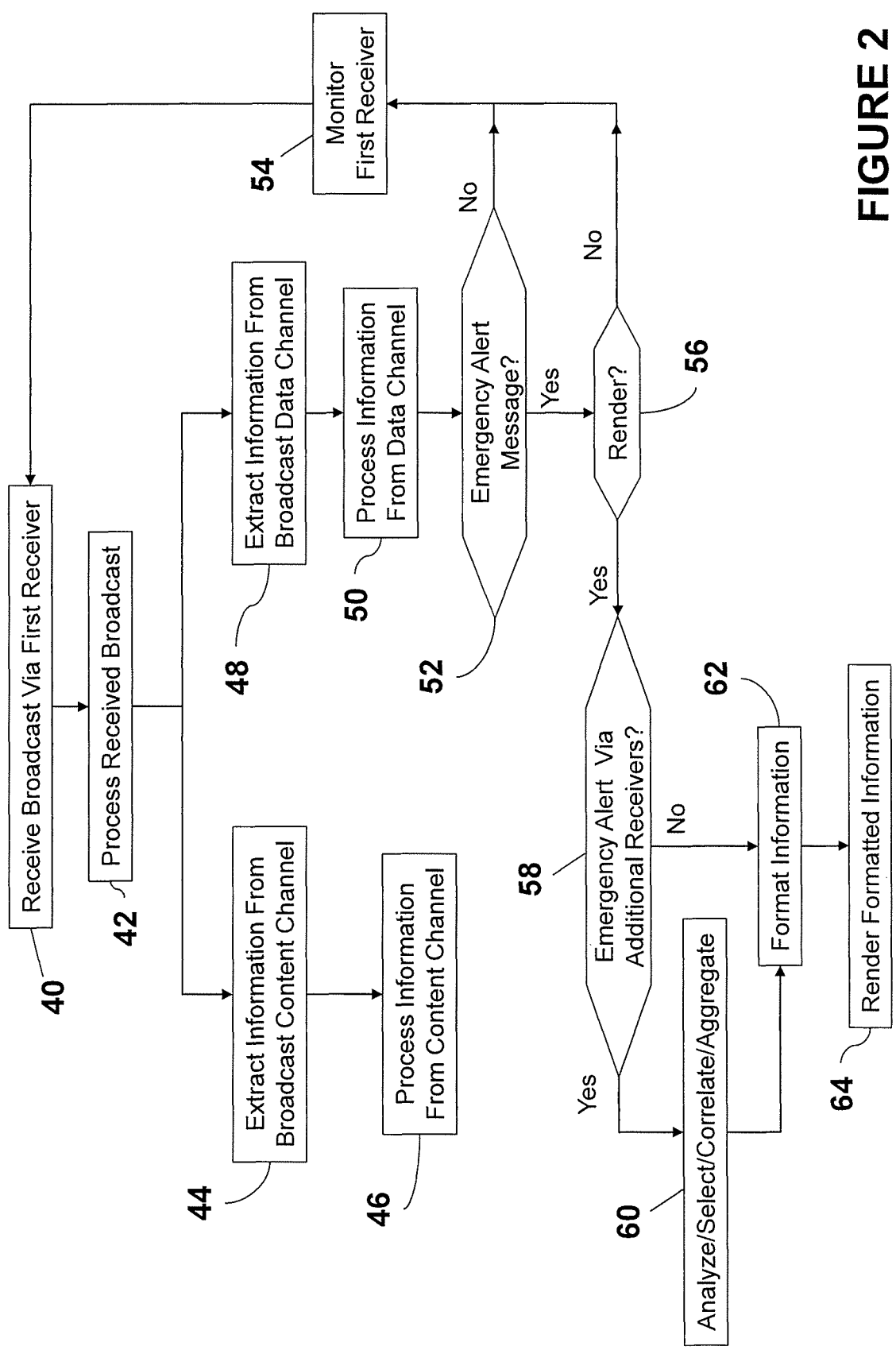
FIG. 2 is a flow diagram of an example process for processing a broadcast.

FIG. 2 is a flow diagram of an example process for processing a broadcast. A broadcast may be received by a first receiver at step 40. The first receiver may be any one of multiple receivers of a device (e.g., mobile device). For example, the first receiver may be compatible with any of the receiver types utilizable by the intended recipients 24, 26, 28, 30, 32, 34, 36, and 38 depicted in FIG. 1. Thus, in an example embodiment, the first receiver may be a receiver capable of receiving FM radio broadcasts, AM radio broadcast, DTV broadcasts, NWR broadcasts, satellite broadcasts, or the like. It is to be understood that the process depicted in FIG. 2 may occur concurrently on multiple receiver of the device.

The received broadcast is processed at step 42. The received broadcast may be processed in any appropriate manner. For example, the received broadcast may be separated into a broadcast channel and a broadcast data channel. Information may be extracted from the broadcast content channel at step 44 and the information extracted from the broadcast content channel may be processed at step 46. The information extracted from the broadcast content channel may be processed in any appropriate manner. For example, if the information extracted from the broadcast content channel comprises streaming video, the information extracted from the broadcast content channel may be processed to render the streaming video; if the information extracted from the broadcast content channel comprises voice information, the information extracted from the broadcast content channel may be processed to render the voice information; etc.

Information may be extracted from the broadcast data channel at step 48. The information extracted from the broadcast data channel may be processed at step 50. The information extracted from the broadcast data channel may be processed in any appropriate manner. For example, the information extracted from the broadcast data channel may be processed to determine the type of information contained therein. Accordingly, it may be determined, at step 52 if the information extracted from the broadcast data channel comprises an emergency alert message. If it is determined, at step 52, that the information extracted from the broadcast data channel does not comprise an emergency message, the first receiver may be monitored at step 54, and the process may proceed to step 40.

If it is determined, at step 52, that the information extracted from the broadcast data channel does not comprise an emergency message, the first receiver may be monitored at step 54, and the process may proceed to step 40.

If it is determined, at step 52, that the information extracted from the broadcast data channel comprises an emergency message, it may be determined, at step 56, if emergency alert information is to be rendered by the device. For example, a user of the device may decide that certain types of alerts should not be rendered. In an example embodiment, a user may be a subscriber to an emergency alert system subscription may decide that certain types of alerts should not be rendered. For example, a user may be provided the option to opt out of any type of alert message, or any combination of alert messages. In an example embodiment, a user may be given the opportunity to opt out of all but the Presidential alerts. The opt-out process is based on the classification of threat, alert types and/or alert classifications, and AMBER Alerts. In an example configuration, presidential messages may always be received and processed, and the opt-out process may provide a subscriber the choice to opt out of all messages, all severe alert messages, and/or AMBER alerts. A subscriber may choose to opt out (not render) an emergency alert message if the alert area does not pertain to the location of the device/subscriber.

In an example embodiment, when the an emergency alert message is received, a broadcast alert preference table, or the like, may be accessed to determine what types of emergency alert message may be rendered, what types of emergency alert message may not be rendered, or any appropriate combination thereof. The type of a received emergency alert message may be compared with information stored in the broadcast alert preference table, which may be in the form of a data base or the like. In an example embodiment, information in the broadcast alert preference table may be updated by the user. The broadcast alert preference table may be used to manage the user opt out capabilities.

If it is determined, at step 56, that received emergency alert information is not to be rendered, the first receiver may be monitored at step 54, and the process may proceed to step 40.

If it is determined, at step 56, that received emergency alert information is be rendered, it may be determined, at step 58, if another receiver or other receivers of the device have received, or are receiving, emergency alert information. If it is determined, at step 58, that no other receiver is receiving emergency alert information, the received alert information may be formatted at step 62. The information may be formatted such that information received via any receiver of the device will be rendered in a predetermined format. For example, the predetermined format may comprise a format compatible with the Commercial Mobile Alert System (CMAS), the Emergency Alert System (EAS), Public Warning System (PWS), Earthquake, Tsunami Warning System (ETWS), Child Abduction Alert System, J-Alert, National Severe Weather Warning Service, Tsunami Warning System, EU-Alerts, Mt Rainier Volcano Lahar Warning System, or the like. The predetermined format may be utilized to provide a consistent rendering of emergency alert information. For example, the predetermined format may render specific type of alert, consistently in the same manner (e.g., Amber alerts always are rendered via a specific audible tone and a specific vibratory cadence). Other examples of consistent format may involve the ordering of information within the alert message such as, for example, alert type, area affected, expiration date and time, action to be taken, and initiating authority. The formatted emergency alert information may be rendered via the device at step 64.

If it is determined, at step 58, that another receiver or other receivers of the device have received, or are receiving, emergency alert information, the information received by the other receiver(s) may be analyzed at step 60 to determine if the other received information is related to emergency information received via the first receiver.

For example, other information may pertain to the same emergency and/or to the same alert area as the information received via the first receiver. Emergency alert information received by all receivers may analyzed, at step 60, to determine if information from a single receiver is to be selected for rendering, if information from multiple receivers is to be correlated and/or aggregated prior to rendering. For example, a user may have a preference for a particular receiver, if available, to use for emergency alert information (e.g., use FM receiver if available). In another example embodiment, the device may select a receiver based on quality of information (e.g., signal to noise ratio, bit rate, resolution), based on power consumption (e.g., select the receiver that utilized the least amount of power of all receivers receiving emergency alert information), based on the amount of information being received (e.g., a DTV receiver may be receiving more details about an emergency alert than an AM receiver), or any appropriate combination thereof. Thus, in an example scenario, a DTV receiver may be receiving more detail about an emergency alert than an AM receiver. The DTV receiver could be selected because more detail is available, or the AM receiver could be selected because it uses less power. In another example embodiment, information from multiple receivers may be combined via correlation and/or aggregation, prior to rendering in order to render as complete as possible, information about the emergency alert. Correlation may be used to assess what information is common among multiple receivers, and the results of this assessment may be utilized to render a confidence level or the like regarding the emergency alert information. Aggregation may be used to collect all information from multiple receivers in order to attempt to render a complete description of the emergency. Preferences regarding which receiver to select, whether to correlate, whether to aggregate, etc. as described above, may be stored in the device, such as, for example, in the broadcast alert preference table.

The selected, correlated, and/or aggregated information may be formatted at step 62 and rendered at step 64 as described above.

Figure 3:
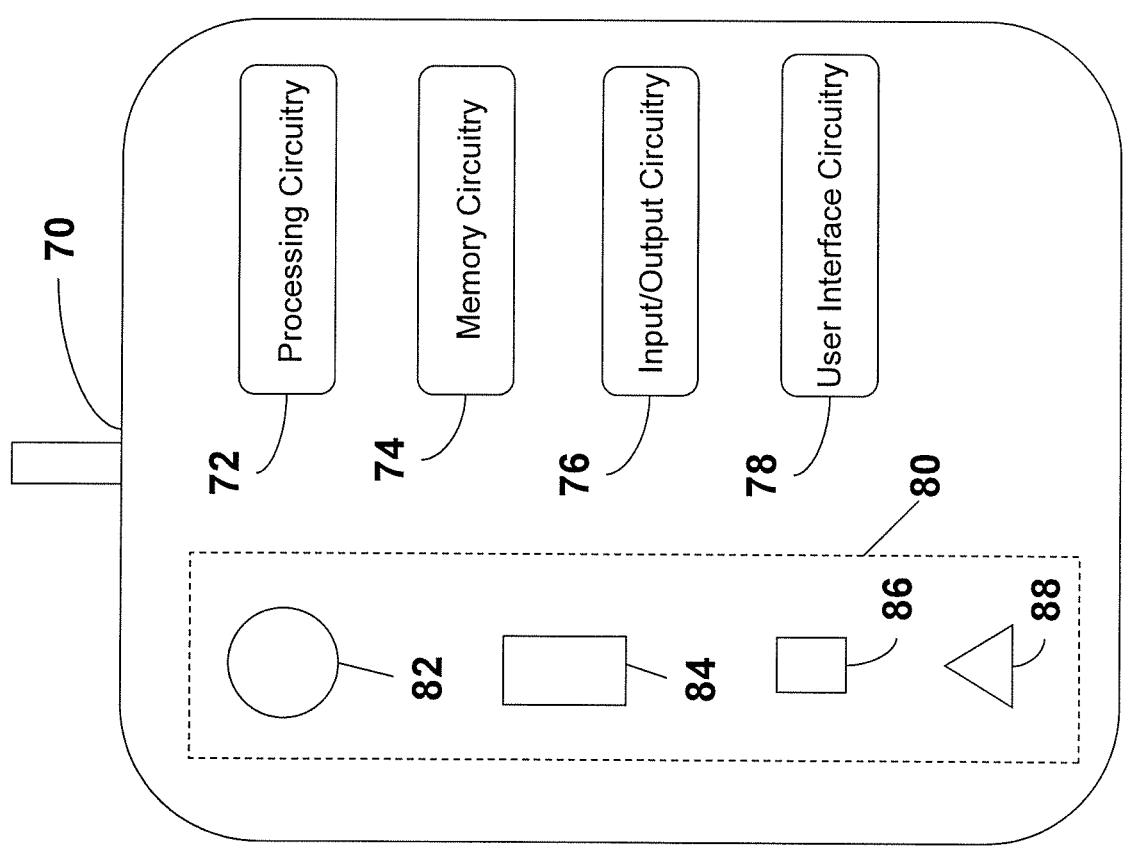
FIG. 3 is a block diagram of an example wireless communications device 70 that is configurable to receive an emergency alert message via a broadcast data channel.

FIG. 3 is a block diagram of an example wireless communications device 70 that is configurable to receive an emergency alert message via a broadcast data channel. In an example embodiment, the communication device 70 may comprise any one of, or any appropriate combination of communications devices 24, 26, 28, 30, 32, 34, 36, and 38 described herein. The communications device 70 may include any appropriate device, mechanism, software, and/or hardware for receiving an emergency alert message via a broadcast data channel as described herein. As described herein, the communications device 70 may comprise hardware or a combination of hardware and software. In an example configuration, the communications device 70 may comprise processing circuitry 72, memory circuitry 74, input/output circuitry 76, user interface (UI) circuitry 78, and sensor circuitry 80 comprising at least one of a video camera portion 82, a force/wave sensor 84, a microphone 86, a moisture sensor 88, or a combination thereof. The force/wave sensor may comprise at least one of a motion detector, an accelerometer, an acoustic sensor, a tilt sensor, a pressure sensor, a temperature sensor, or the like. The motion detector may be configured to detect motion occurring outside of the communications device, for example via disturbance of a standing wave, via electromagnetic and/or acoustic energy, or the like. The accelerator may be capable of sensing acceleration, motion, and/or movement of the communications device. The acoustic sensor may be capable of sensing acoustic energy, such as a loud noise, for example. The tilt sensor may be capable of detecting a tilt of the communications device. The pressure sensor may be capable of sensing pressure against the communications device, such as from a shock wave caused by broken glass or the like. The temperature sensor may be capable of sensing a measuring temperature, such as inside of the vehicle, room, building, or the like. The moisture sensor 88 may be capable of detecting moisture, such as detecting if the communications device 70 is submerged in a liquid. The processing circuitry 72, memory circuitry 74, input/output circuitry 76, user interface (UI) circuitry 78, video camera portion 82, force/wave sensor 84, and microphone 86 may be coupled together to allow communications therebetween (coupling not shown in FIG. 3). The communications device may comprise a timer (not depicted in FIG. 3).

In various embodiments, the input/output circuitry 76 may comprise a receiver of the communications device 70, a transmitter of the communications device 70, or a combination thereof. In various example embodiments, the input/output circuitry 76 may comprise multiple receivers. Receivers may include, for example, a cellular receiver, a broadcast receiver such as FM, AM, DTV, a satellite receiver, a NWR receiver, a GPS receiver, etc. The input/output circuitry 76 may be capable of receiving and/or providing information pertaining to receiving an emergency alert message via a broadcast data channel as described herein. The input/output circuitry 76 may be capable of communications with a other communication devices and/or wireless networks as described herein. For example, the input/output circuitry 76 may include a wireless communications (e.g., 2.5G/3G/4G) SIM card. The input/output circuitry 76 may be capable of receiving and/or sending video information, audio information, control information, image information, data, or any combination thereof. In an example embodiment, the input/output circuitry 76 may be capable of receiving and/or sending information to determine a location of the communications device 70. In an example configuration, the input\output circuitry 76 may comprise a GPS receiver. In an example configuration, the communications device 70 may determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 76 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a WIFI finder, a two way GPS chipset or equivalent, or the like.

The processing circuitry 72 may be capable of facilitating receiving an emergency alert message via a broadcast data channel as described herein. For example, the processing circuitry 72 may be capable of, in conjunction with any other portion of the communications device 70, executing an application for receiving a broadcast via a receiver or receivers of the communications device 70, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of the communications device 70, analyzing emergency alert information from one and/or multiple receivers of the communications device 70, selecting emergency alert information from one and/or multiple receivers of the communications device 70, correlating emergency alert information from one and/or multiple receivers of the communications device 70, aggregating emergency alert information from one and/or multiple receivers of the communications device 70, formatting information, rendering information, or the like, as described herein, or any appropriate combination thereof. The processing circuitry 72, in conjunction with any other portion of the communications device 70, may provide the ability for users/subscribers to enable, disable, and configure various features of an application for receiving an emergency alert message via a broadcast data channel, as described herein. For example, a user, subscriber, parent, healthcare provider, law enforcement agent, or the like, may be able to define configuration parameters such as, for example, an emergency contact list, voice/text/image/video options for an emergency call, threshold settings (e.g., timer settings, signature settings, etc.), to be utilized when sending and/or receiving a text/voice messages. The processing circuitry 72, in conjunction with any other portion of the communications device 70, may enable the communications device 70 to covert speech to text when it is configured to send text messages. In an example embodiment, the processing circuitry 72, in conjunction with any other portion of the communications device 70, may be able to convert text to speech for rendering via the user interface circuitry 78.

In a basic configuration, the communications device 70 may include memory circuitry 74. The memory circuitry 74 may be able store any information utilized in conjunction with receiving an emergency alert message via a broadcast data channel as described herein. For example, the memory circuitry 74 may be capable of storing information pertaining to executing an application for receiving an emergency alert message via a broadcast data channel, generating a non-voice message, generating a voice message, executing an application for receiving a broadcast via a receiver or receivers of the communications device 70, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of the communications device 70, analyzing emergency alert information from one and/or multiple receivers of the communications device 70, selecting emergency alert information from one and/or multiple receivers of the communications device 70, correlating emergency alert information from one and/or multiple receivers of the communications device 70, aggregating emergency alert information from one and/or multiple receivers of the communications device 70, formatting information, rendering information, or the like, as described herein, or any appropriate combination thereof.

Depending upon the exact configuration and type of processor, the memory circuitry 74 may be volatile (such as some types of RAM), non-volatile (such as ROM, flash memory, etc.). The communications device 70 may include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory circuitry 74, or a portion of the memory circuitry 72 may be hardened such that information stored therein can be recovered if the communications device 70 is exposed to extreme heat, extreme vibration, extreme moisture, corrosive chemicals or gas, or the like. In an example configuration, the information stored in the hardened portion of the memory circuitry 74 may be encrypted, or otherwise rendered unintelligible without use of an appropriate cryptographic key, password, biometric (voiceprint, fingerprint, retinal image, facial image, or the like). Wherein, use of the appropriate cryptographic key, password, biometric may render the information stored in the hardened portion of the memory circuitry 74 intelligible.

The communications device 70 also may contain user inter face (UI) circuitry 78 allowing a user to communicate with the communications device 70. The UI circuitry 78 may be capable of rendering any information utilized in conjunction receiving an emergency alert message via a broadcast data channel as described herein. For example, the UI circuitry 78 may contain circuitry for entering text, entering a phone number, rendering text, rendering images, rendering multimedia, rendering sound, rendering video, receiving sound, or the like, as described herein, or any appropriate combination thereof. The UI circuitry 78 may provide the ability to control the communications device 70, via, for example, buttons, soft keys, voice actuated controls, a touch screen, movement of the mobile communications device 70, visual cues (e.g., moving a hand in front of a camera on the mobile communications device 70), or the like. The UI circuitry 78 may provide visual information (e.g., via a display), audio information (e.g., via speaker), mechanically (e.g., via a vibrating mechanism), or a combination thereof. In various configurations, the UI circuitry 78 may comprise a display, a touch screen, a keyboard, a speaker, or any combination thereof. The UI circuitry 78 may comprise circuitry for inputting biometric information, such as, for example, fingerprint information, retinal information, voice information, and/or facial characteristic information. The UI circuitry 78 may be utilized to enter an indication of the designated destination (e.g., the phone number, IP address, or the like).

In an example embodiment, the sensor circuitry 80 of the communications device 70 may comprise the video camera portion 82, the force/wave sensor 84, and the microphone 86. The video camera portion 82 may comprise a camera (or cameras) and associated equipment capable of capturing still images and/or video and to provide the captured still images and/or video to other portions of the communications device 70. In an example embodiment, the force/wave sensor 84 may comprise an accelerometer, a tilt sensor, an acoustic sensor capable of sensing acoustic energy, an optical sensor (e.g., infrared), or any combination thereof.

Figure 4:
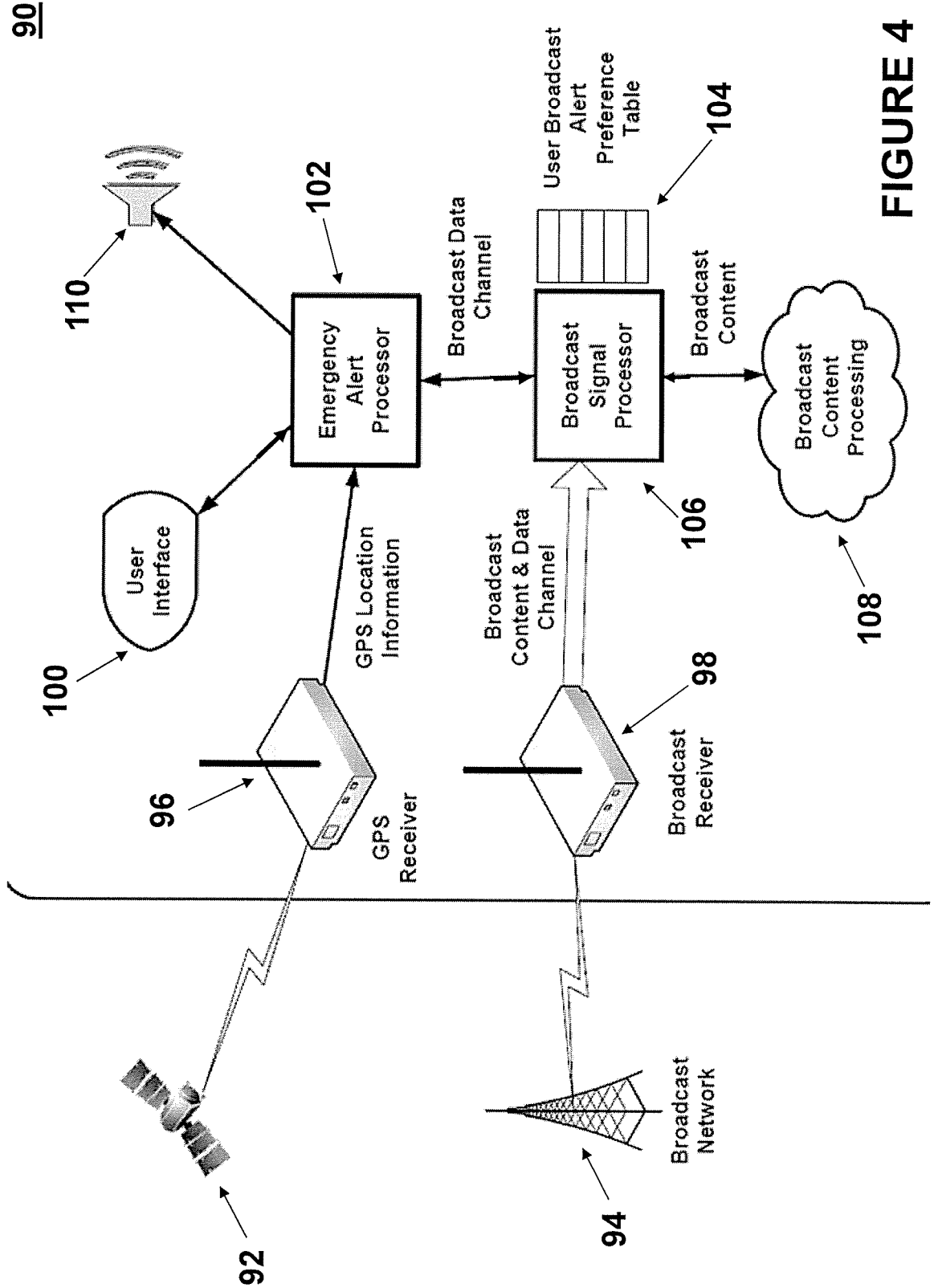
FIG. 4 is another block diagram of an example wireless communications device 90 that is configurable to receive an emergency alert message via a broadcast data channel.

FIG. 4 is another block diagram of an example wireless communications device 90 that is configurable to receive an emergency alert message via a broadcast data channel. As depicted in FIG. 4, communications device 90 may comprise multiple receivers (e.g., GPS receiver 96, broadcast receiver 98), a user interface 100, and emergency alert processor 102, a broadcast signal processor 106, a broadcast alert preference table 104, a broadcast content processor 108, and a rendering mechanism 110.

In an example embodiment, the communication device 90 may comprise any one of, or any appropriate combination of communications devices 24, 26, 28, 30, 32, 34, 36, and 38 described herein. The communications device 90 may include any appropriate device, mechanism, software, and/or hardware for receiving an emergency alert message via a broadcast data channel as described herein. The communications device 90 may comprise hardware or a combination of hardware and software. In an example configuration, the communications device 90 may comprise input/output circuitry that may comprise GPS receiver 96 configured to receive GPS information from a GPS satellite 92, or the like, and broadcast receiver 98 configured to receive a broadcast from a broadcast network 94, or the like. The broadcast receiver 98 may comprise an FM, an AM, a DTV receiver, or the like, or any appropriate combination thereof. The GPS receiver 96 may be configured to facilitate the communication device 90 determining its geographical location through any type of location determination system including, for example, the Global Positioning System (GPS), assisted GPS (A-GPS), time difference of arrival calculations, configured constant location (in the case of non-moving devices), any combination thereof, or any other appropriate means.

In an example configuration, the processing circuitry of communications device 90 may comprise emergency alert processor 102, broadcast signal processor 106, and broadcast content processing circuitry 108. The processing circuitry of communications device 90 may be capable of facilitating receiving an emergency alert message via a broadcast data channel as described herein. For example, emergency alert processor 102, broadcast signal processor 106, and broadcast content processing circuitry 108, may be capable of, in conjunction with any other portion of the communications device 90, executing an application for receiving a broadcast via a receiver or receivers of the communications device 90, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of the communications device 90, analyzing emergency alert information from one and/or multiple receivers of the communications device 90, selecting emergency alert information from one and/or multiple receivers of the communications device 90, correlating emergency alert information from one and/or multiple receivers of the communications device 90, aggregating emergency alert information from one and/or multiple receivers of the communications device 90, formatting information, rendering information, or the like, as described herein, or any appropriate combination thereof.

The communications device 90 may comprise memory circuitry that may comprise broadcast alert preference table 104. The preference table 104 may be able store any information utilized in conjunction with receiving an emergency alert message via a broadcast data channel as described herein. For example, the preference table 104 may be capable of storing information pertaining to executing an application for receiving an emergency alert message via a broadcast data channel, executing an application for receiving a broadcast via a receiver or receivers of the communications device 90, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of the communications device 90, analyzing emergency alert information from one and/or multiple receivers of the communications device 90, selecting emergency alert information from one and/or multiple receivers of the communications device 90, correlating emergency alert information from one and/or multiple receivers of the communications device 90, aggregating emergency alert information from one and/or multiple receivers of the communications device 90, formatting information, rendering information, communication device preferences, user/subscriber preferences, or the like, as described herein, or any appropriate combination thereof.

The communications device 90 also may contain user inter face (UI) circuitry 100 allowing a user to communicate with the communications device 90. The UI circuitry 100 may be capable of rendering any information utilized in conjunction receiving an emergency alert message via a broadcast data channel as described herein. For example, the UI circuitry 100 may contain circuitry for entering text, entering a phone number, rendering text, rendering images, rendering multimedia, rendering sound, rendering video, receiving sound, or the like, as described herein, or any appropriate combination thereof. The UI circuitry 100 may provide the ability to control the communications device 90, via, for example, buttons, soft keys, voice actuated controls, a touch screen, movement of the mobile communications device 90, visual cues (e.g., moving a hand in front of a camera on the mobile communications device 90), or the like. The UI circuitry 100 may provide visual information (e.g., via a display), audio information (e.g., via speaker 110), mechanically (e.g., via a vibrating mechanism), or a combination thereof. In various configurations, the UI circuitry 100 may comprise a display, a touch screen, a keyboard, a speaker, or any combination thereof. The UI circuitry 100 may comprise circuitry for inputting biometric information, such as, for example, fingerprint information, retinal information, voice information, and/or facial characteristic information. The UI circuitry 100 may be utilized to enter an indication of the designated destination (e.g., the phone number, IP address, or the like).

Figure 5:
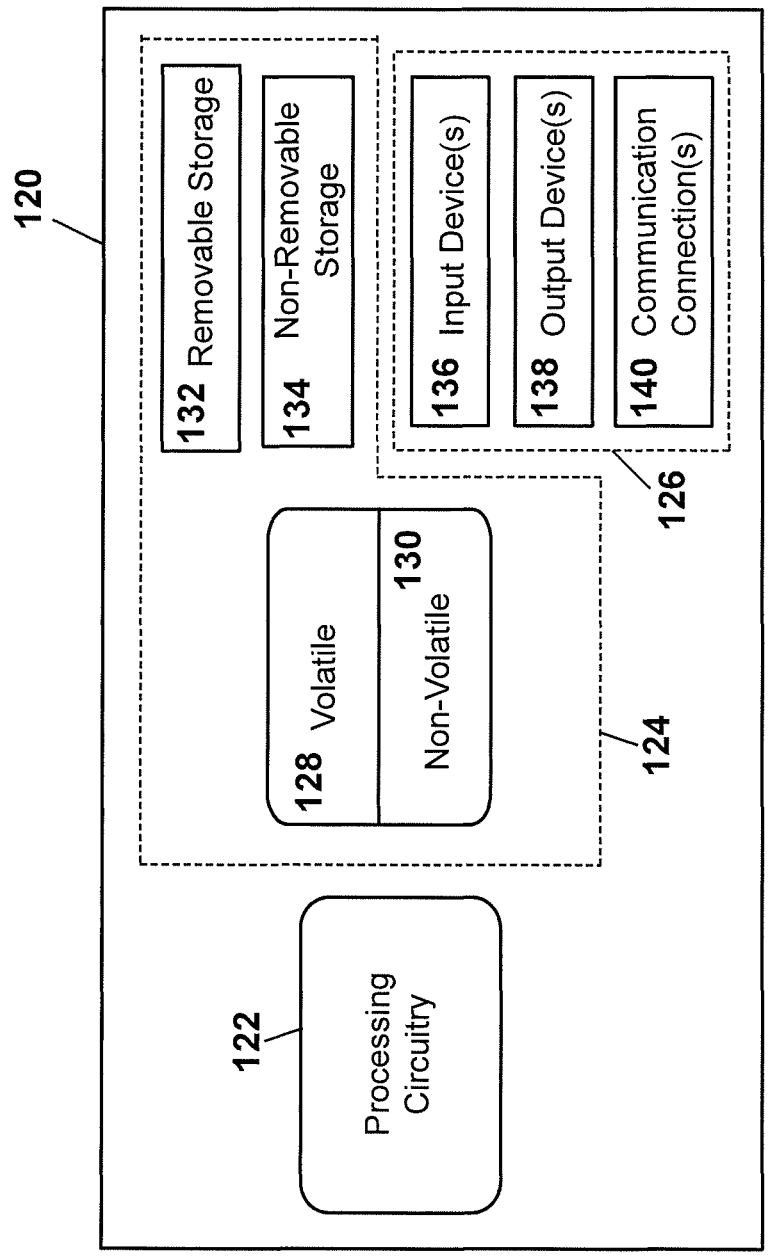
FIG. 5 is a block diagram of an example network entity 120 that may be used in conjunction with a communications device to receive an emergency alert message via a broadcast data channel.

FIG. 5 is a block diagram of an example network entity 120 that may be used in conjunction with a communications device to receive an emergency alert message via a broadcast data channel. In various example embodiments, functions associated with receiving an emergency alert message via a broadcast data channel may be performed by a communications device (e.g., communications device 70, communications device 90), a network entity (e.g., network entity 120), or any appropriate combination thereof. In an example embodiment, the network entity 120 may comprise hardware or a combination of hardware and software. The functionality needed to facilitate receiving an emergency alert message via a broadcast data channel may reside in any one or combination of network entities and/or communications devices. The network entity 120 depicted in FIG. 5 represents any appropriate entity, apparatus, or combination of entities or apparatuses, such as a processor, a server, a gateway, etc., or any combination thereof. It is emphasized that the block diagram depicted in FIG. 5 is exemplary and not intended to imply a specific implementation or configuration. Thus, the network entity 120 may be implemented in a single processor or multiple processors (e.g., single server or multiple servers, single gateway or multiple gateways, etc.). Multiple servers may be distributed or centrally located. Multiple servers may communicate wirelessly, via hard wire, or a combination thereof.

In an example configuration, the network entity 120 may comprise processing circuitry 122, memory circuitry 124, and input/output circuitry 126. The processing circuitry 122, memory circuitry 124, and input/output circuitry 126 are coupled together (coupling not shown in FIG. 5) to allow communications therebetween. The processing circuitry 122 may be capable of performing functions associated with receiving an emergency alert message via a broadcast data channel, as described herein. For example, the processing circuitry 122 may be capable of, in conjunction with any other portion of the network entity 120, executing an application for receiving a broadcast via a receiver or receivers of a communications device, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of a communications device, analyzing emergency alert information from one and/or multiple receivers of a communications device, selecting emergency alert information from one and/or multiple receivers of a communications device, correlating emergency alert information from one and/or multiple receivers of a communications device, aggregating emergency alert information from one and/or multiple receivers of a communications device, formatting information, rendering information, or the like, as described herein, or any appropriate combination thereof. The processing circuitry 122, in conjunction with any other portion of the network entity 120, may provide the ability for users/subscribers to enable, disable, and configure various features of an application for receiving an emergency alert message via a broadcast data channel, as described herein. For example, a user, subscriber, parent, healthcare provider, law enforcement agent, or the like, may be able to define configuration parameters such as, for example, an emergency contact list, voice/text/image/video options for an emergency call, threshold settings (e.g., timer settings, signature settings, etc.), to be utilized when sending and/or receiving a text/voice messages. The processing circuitry 122, in conjunction with any other portion of the network entity 122 and/or a communications device, may enable a communications device to covert speech to text when it is configured to send text messages. In an example embodiment, the processing circuitry 122, in conjunction with any other portion of the network entity 120 and/or a communications device, may be able to convert text to speech for rendering via a user interface circuitry.

The input/output circuitry 126 may be capable of receiving and/or providing information from/to a device (e.g., communications device 70, communications device 90), and/or other network entities, when facilitating receiving an emergency alert message via a broadcast data channel, as described herein. For example, the input/output circuitry 126 may include a wireless communications (e.g., 2.5G/3G/4G) SIM card. The input/output circuitry 126 may be capable of receiving and/or sending video information, audio information, control information, image information, data, or any combination thereof. In an example embodiment, the input/output circuitry 126 may be capable of receiving and/or sending information to determine a location of a communications device (e.g., communications device 70, communications device 90). In an example configuration, the input\output circuitry 126 may comprise a GPS receiver. In an example configuration, a geographical location may be determined through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 126 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a WIFI finder, a two way GPS chipset or equivalent, or the like.

The memory circuitry 124 may store any information utilized in conjunction with facilitating receiving an emergency alert message via a broadcast data channel, as described herein. For example, the memory circuitry 124 may be capable of storing information pertaining to executing an application for receiving an emergency alert message via a broadcast data channel, generating a non-voice message, generating a voice message, executing an application for receiving a broadcast via a receiver or receivers of a communications device, processing a broadcast, separating a content channel and data channel from a broadcast, extracting information from a broadcast content channel, extracting information from a broadcast data channel, processing information from a broadcast content channel, processing information from a broadcast data channel, monitoring a receiver, determining if information from a broadcast data channel comprises an emergency alert message, determining if emergency alert information is to be rendered, accessing a broadcast alert preference table or the like, determining if an emergency alert message is received via multiple receivers of a communications device, analyzing emergency alert information from one and/or multiple receivers of the communications device 70, selecting emergency alert information from one and/or multiple receivers of a communications device, correlating emergency alert information from one and/or multiple receivers of a communications device, aggregating emergency alert information from one and/or multiple receivers of a communications device, formatting information, rendering information, or the like, as described herein, or any appropriate combination thereof.

Depending upon the exact configuration and type of network entity 120, the memory circuitry 124 may include computer storage media that is volatile 128 (such as dynamic RAM), non-volatile 130 (such as ROM), or a combination thereof. The network entity 120 may include additional storage, in the form of computer storage media (e.g., removable storage 132 and/or non-removable storage 134) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is a tangible article of manufacture and thus not a transient signal.

The network entity 120 also may contain communications connection(s) 140 that allow the network entity 120 to communicate with other devices, entities, servers, or the like. A communications connection(s) can comprise communication media. Communication media may be used to communicate computer readable instructions, data structures, program modules, or other data. Communication media can include an appropriate transport mechanism or information delivery media that may be used to transport a modulated data signal such as a carrier wave.

The network entity 120 also may include input device(s) 136 such as keyboard, mouse, pen, voice input device, touch input device, etc. Output device(s) 138 such as a display, speakers, printer, etc. also can be included.

Communications devices (e.g., communications device 70, communications device 90) and network entities (e.g., network entity 120) may be part of and/or in communication with various wireless communications networks. Some of which are described below.

Figure 6:
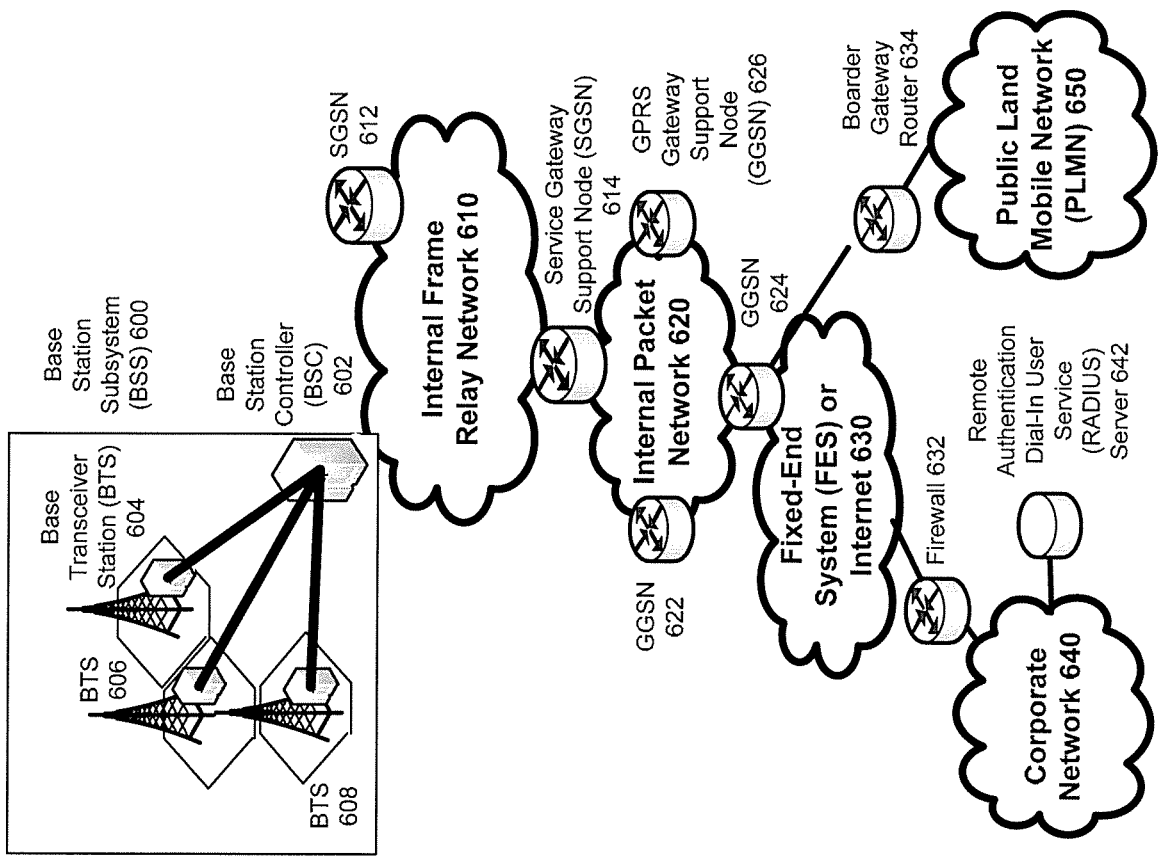
FIG. 6 depicts an overall block diagram of an exemplary packet-based mobile cellular network environment, such as a GPRS network, in which receiving an emergency alert message via a broadcast data channel may be implemented.

FIG. 6 depicts an overall block diagram of an exemplary packet-based mobile cellular network environment, such as a GPRS network, in which receiving an emergency alert message via a broadcast data channel may be implemented. In the exemplary packet-based mobile cellular network environment shown in FIG. 6, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 7:
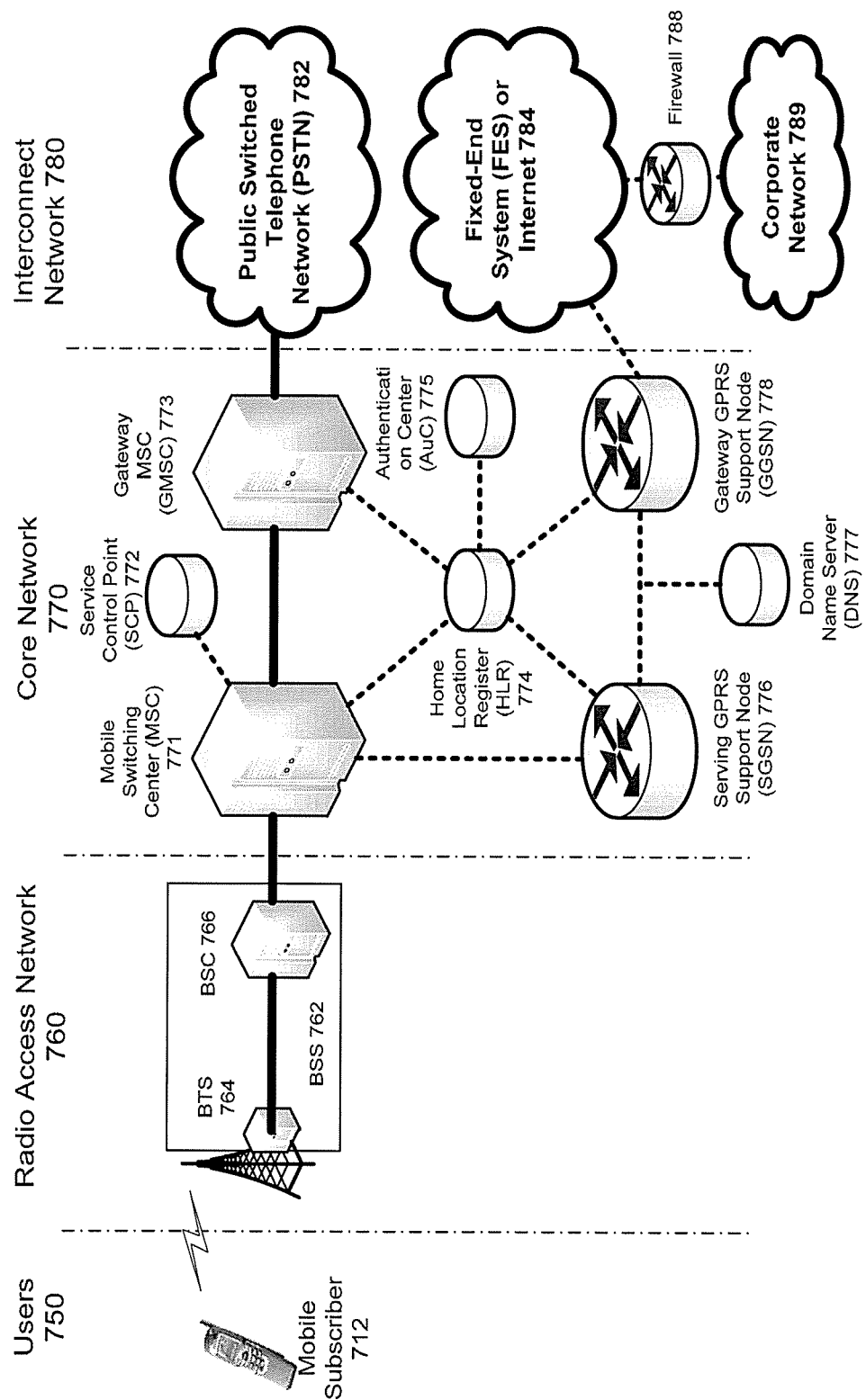
FIG. 7 illustrates an architecture of a typical GPRS network in which receiving an emergency alert message via a broadcast data channel may be implemented.

FIG. 7 illustrates an architecture of a typical GPRS network in which receiving an emergency alert message via a broadcast data channel may be implemented. The architecture depicted in FIG. 7 is segmented into four groups: users 750, radio access network 760, core network 770, and interconnect network 780. Users 750 comprise a plurality of end users. Note, device 712 is referred to as a mobile subscriber in the description of network shown in FIG. 7. In an example embodiment, the device depicted as mobile subscriber 712 comprises a communications device (e.g., communications device 14, communications device 70). Radio access network 760 comprises a plurality of base station subsystems such as BSSs 762, which include BTSs 764 and BSCs 766. Core network 770 comprises a host of various network elements. As illustrated in FIG. 7, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 7, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 7, when mobile subscriber 712 initiates the attach process by turning on the network capabilities of the mobile device, an attach request is sent by mobile subscriber 712 to SGSN 776. The SGSN 776 queries another SGSN, to which mobile subscriber 712 was attached before, for the identity of mobile subscriber 712. Upon receiving the identity of mobile subscriber 712 from the other SGSN, SGSN 776 requests more information from mobile subscriber 712. This information is used to authenticate mobile subscriber 712 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 712 was attached before, to cancel the location process for mobile subscriber 712. HLR 774 then notifies SGSN 776 that the location update has been performed. At this time, SGSN 776 sends an Attach Accept message to mobile subscriber 712, which in turn sends an Attach Complete message to SGSN 776.

After attaching itself with the network, mobile subscriber 712 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 712. The mobile subscriber 712 uses an algorithm to send the user identification (ID) and password to SGSN 776. The SGSN 776 uses the same algorithm and compares the result. If a match occurs, SGSN 776 authenticates mobile subscriber 712.

Next, the mobile subscriber 712 establishes a user session with the destination network, corporate network 789, by going through a Packet Data Protocol ("PDP") activation process. Briefly, in the process, mobile subscriber 712 requests access to the Access Point Name ("APN"), for example, UPS.com, and SGSN 776 receives the activation request from mobile subscriber 712. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 712.

Once activated, data packets of the call made by mobile subscriber 712 can then go through radio access network 760, core network 770, and interconnect network 780, in a particular fixed-end system or Internet 784 and firewall 788, to reach corporate network 789.

Figure 8:
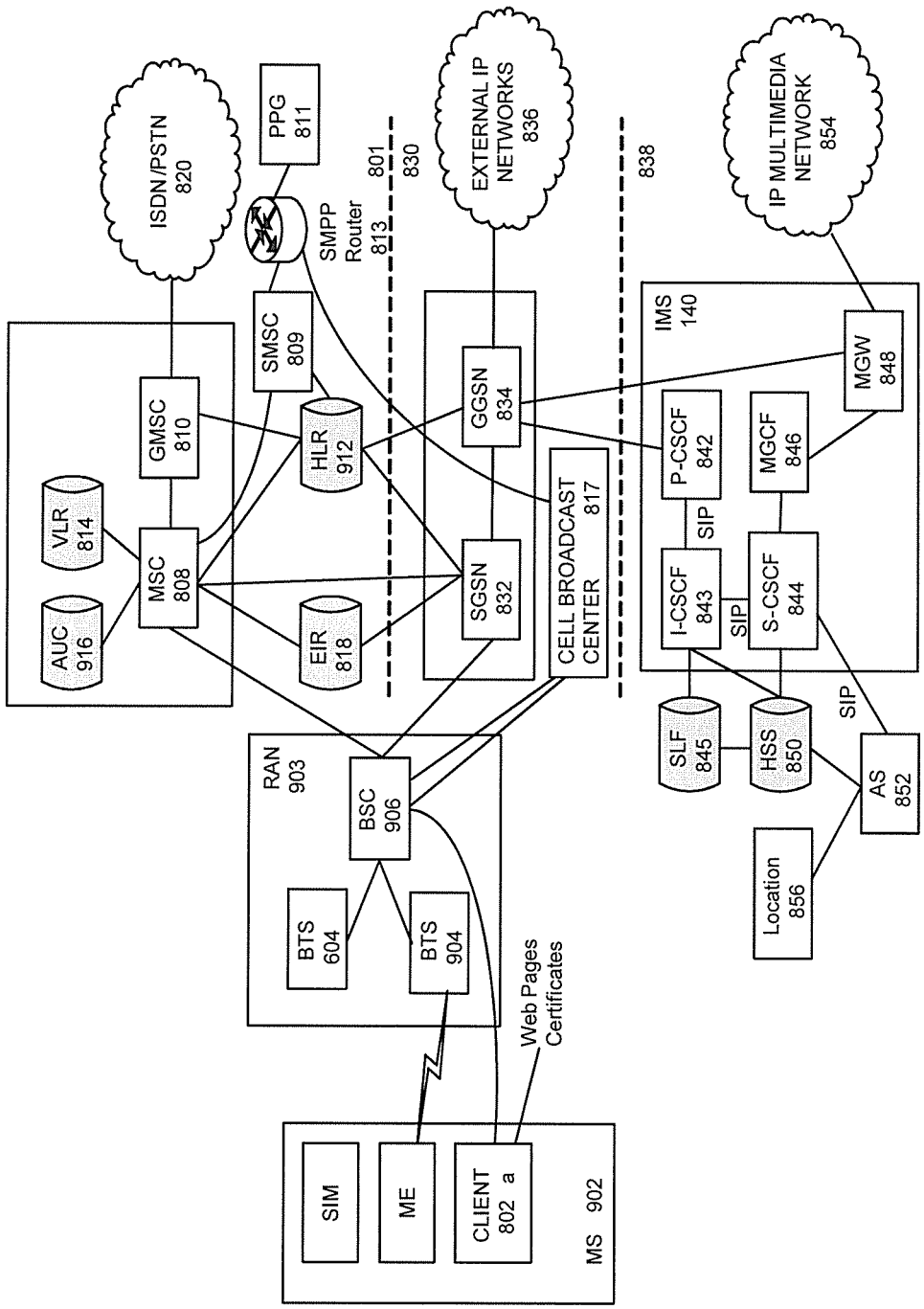
FIG. 8 illustrates an exemplary block diagram view of a GSM/GPRS/IP multimedia network architecture within which receiving an emergency alert message via a broadcast data channel may be implemented.

FIG. 8 illustrates an exemplary block diagram view of a GSM/GPRS/IP multimedia network architecture within which receiving an emergency alert message via a broadcast data channel may be implemented. As illustrated, the architecture of FIG. 8 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 817 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 8, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 9:
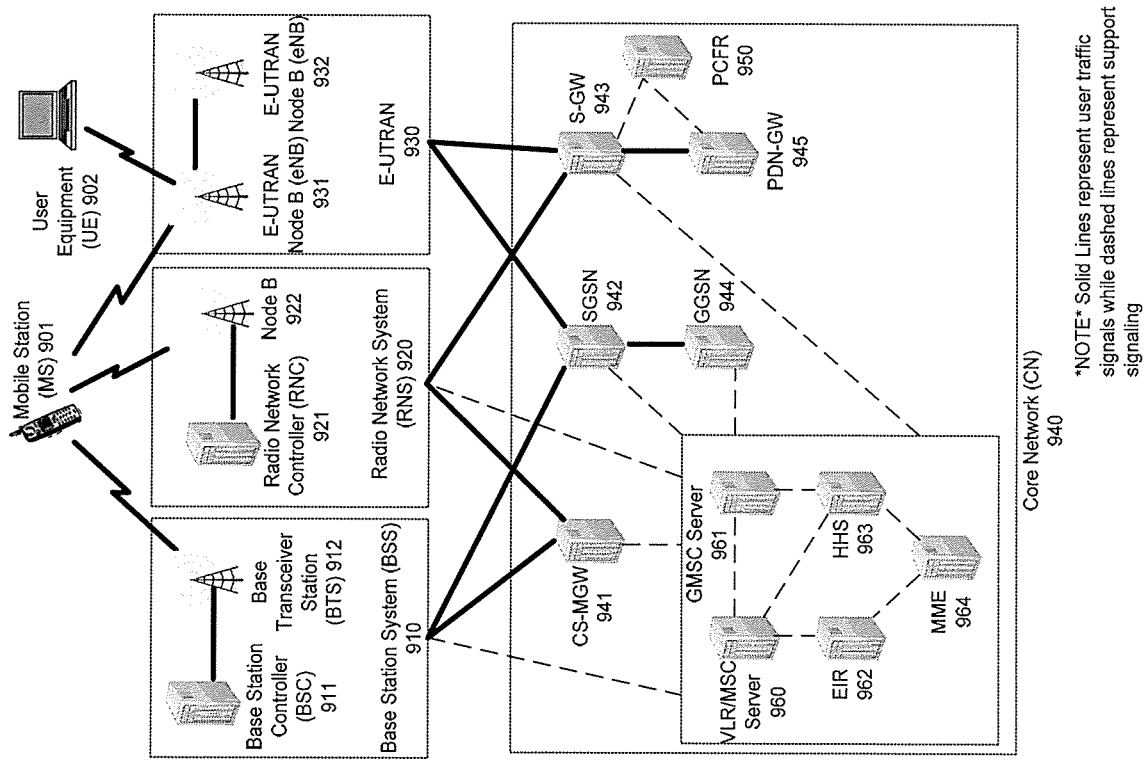
FIG. 9 illustrates a PLMN block diagram view of an exemplary architecture in which receiving an emergency alert message via a broadcast data channel may be incorporated.

FIG. 9 illustrates a PLMN block diagram view of an exemplary architecture in which receiving an emergency alert message via a broadcast data channel may be incorporated. Mobile Station (MS) 901 is the physical equipment used by the PLMN subscriber. In one illustrative embodiment, communications device 40 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

While example embodiments of receiving an emergency alert message via a broadcast data channel have been described in connection with various computing devices/processors, the underlying concepts can be applied to any computing device, processor, and/or system capable of facilitating receiving an emergency alert message via a broadcast data channel as described herein. The methods and apparatuses for receiving an emergency alert message via a broadcast data channel, or certain aspects or portions thereof, can take the form of program code (i.e., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for facilitating receiving an emergency alert message via a broadcast data channel. A computer-readable storage medium, as described herein is a tangible article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for receiving an emergency alert message via a broadcast data channel may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating receiving an emergency alert message via a broadcast data channel. When implemented on a general-purpose processor, the program code combines with the processor to provide a unique apparatus that operates to invoke the functionality for receiving an emergency alert message via a broadcast data channel.

While receiving an emergency alert message via a broadcast data channel has been described in connection with the various embodiments of the various figures, it is to be understood that other similar embodiments can be used or modifications and additions can be made to the described embodiments for receiving an emergency alert message via a broadcast data channel. For example, one skilled in the art will recognize that receiving an emergency alert message via a broadcast data channel as described in the present application may apply to any environment, whether wired or wireless, and may be applied to any number of devices connected via a communications network and interacting across the network. Therefore, receiving an emergency alert message via a broadcast data channel should not be limited to any single embodiment, but rather should be construed in breadth and scope in accordance with the appended claims.

What is claimed:

1. A method comprising:
   determining, by a communications device, that a first information received via a first receiver of the communications device is related to an alert message;
   determining, by the communications device, that a second information received via a second receiver of the communications device is related to the alert message, wherein the second information comprises more detail or less detail than the first information;
   aggregating, by the communications device, the first information and the second information into aggregated information based on a user preference;
   formatting the aggregated information in accordance with a predetermined format; and
   rendering, by the communications device, the aggregated information.

2. The method of claim 1, wherein the alert message is an emergency alert message.

3. The method of claim 1, wherein the first information comprises a first broadcast and the second information comprises a second broadcast.

4. The method of claim 3, wherein the first broadcast is one of a frequency modulation (FM), amplitude modulation (AM), National Weather Service (NWR), television (TV), digital television (DTV), or satellite broadcast.

5. A device comprising:
   a processor; and
   a memory coupled with the processor, the memory comprising executable instructions that when executed by the processor cause the processor to effectuate operations comprising:
      determining that a first information received via a first receiver of the device is related to an alert message;
      determining that a second information received via a second receiver of the device is related to the alert message, wherein the second information comprises more detail or less detail than the first information;
      aggregating, based on a user preference, the first information and the second information into aggregated information;
      formatting the aggregated information in accordance with a predetermined format; and
      rendering the aggregated information.

6. The device of claim 5, wherein the alert message is an emergency alert message.

7. The device of claim 5, wherein the first information comprises a first broadcast and the second information comprises a second broadcast.

8. The device of claim 7, wherein the first broadcast is one of a frequency modulation (FM), amplitude modulation (AM), National Weather Service (NWR), television (TV), digital television (DTV), or satellite broadcast.

9. The device of claim 7, wherein at least one of first broadcast and the second broadcast has an associated data channel.

10. The device of claim 7, wherein the first broadcast is a Short Message Peer to Peer (SMPP) broadcast.

11. The device of claim 5, wherein at least one of the first information and the second information comprises video information.

12. The device of claim 5, wherein at least one of the first information and the second information comprises voice information.

13. The device of claim 5, the operations further comprising:
   generating a third information based on the aggregated information; and
   rendering the third information.

14. The device of claim 5, the operations further comprising:
   in response to determining that a second information received via a second receiver of the device is related to the alert message, determining an alert type for the alert message;
   comparing the alert type of the alert message to a broadcast alert preference table; and
   rendering the aggregated information based on the comparison of the alert type of the alert message to the broadcast alert preference table.

15. The device of claim 5, wherein formatting the aggregated information in accordance with a predetermined format comprises ordering of information within the alert message.

16. A system comprising:
   a display; and
   a device communicatively connected with the display, the device comprises:
      a processor; and
      a memory coupled with the processor, the memory comprising executable instructions that when executed by the processor cause the processor to effectuate operations comprising:
         determining that a first information received via a first receiver of the device is related to an alert message;
         determining that a second information received via a second receiver of the device is related to the alert message, wherein the second information comprises more detail or less detail than the first information; and
         aggregating, based on a user preference, the first information and the second information into aggregated information;
         formatting the aggregated information in accordance with a predetermined format; and
         rendering the aggregated information.

17. The system of claim 16, wherein the alert message is an emergency alert message.

18. The system of claim 16, wherein the first information comprises a first broadcast and the second information comprises a second broadcast.

19. The system of claim 16, wherein formatting the aggregated information in accordance with a predetermined format comprises ordering of information within the alert message.

\* \* \* \* \*